United States Patent [19]

Arita

[11] 4,209,807
[45] Jun. 24, 1980

[54] PROJECTION TYPE TELEVISION SET

[75] Inventor: Hachiro Arita, Hirakata, Japan

[73] Assignee: Matsushita Electric Industrial Co., Ltd., Kadoma, Japan

[21] Appl. No.: 965,890

[22] Filed: Dec. 4, 1978

[30] Foreign Application Priority Data

Dec. 14, 1977 [JP] Japan .......................... 52/168616[U]

[51] Int. Cl.² .............................................. H04N 5/74
[52] U.S. Cl. .................................... 358/237; 358/250; 358/254; 312/7 TV
[58] Field of Search ............... 358/231, 237, 254, 250; 312/7 TV

[56] References Cited

U.S. PATENT DOCUMENTS

| | | | |
|---|---|---|---|
| 2,437,631 | 3/1948 | Wood | 248/54 |
| 2,477,911 | 8/1949 | Travis et al. | 248/343 |
| 2,509,508 | 5/1950 | Kalff et al. | 358/254 X |
| 3,294,906 | 12/1966 | Swanson | 358/254 |
| 3,944,734 | 3/1976 | Ogawa | 358/237 X |

Primary Examiner—Robert L. Richardson
Attorney, Agent, or Firm—Spencer & Kaye

[57] ABSTRACT

A projection type television set having a main body, a projecting tube accommodated by the main body, a screen attached to said main body and a mirror box pivotally mounted on the main body for free rotary movement around an axis between a closed position and an opened position, the mirror box including a mirror which is adapted, when the mirror box is in the opened position, to reflect the light coming from the projecting tube and project the same onto the screen so as to make a display of an image on the screen. The mirror box is connected to the main body through at least one control rod which has a tubular body, a spring seat movably received by the tubular body and a pair of coiled springs disposed at respective sides of the spring seat. As the mirror box is swung from the closed position toward the opened position, one of the coiled springs is released to exert a force for assisting the manual opening force, while the other coiled spring is compressed to prevent an abrupt declination of the heavy mirror box attributable to the weight of the same. Similarly, the other coiled spring is released while one of the coiled springs is compressed, when the mirror box is moved from the opened position to the closed position, so as to assist the manual force and to prevent the abrupt declination, respectively.

2 Claims, 6 Drawing Figures

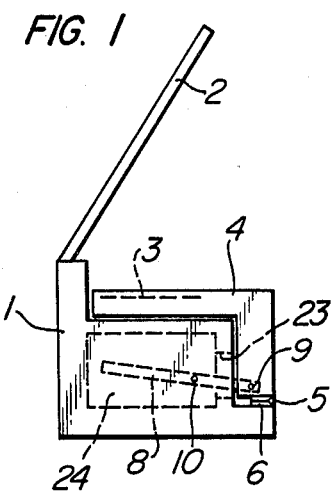
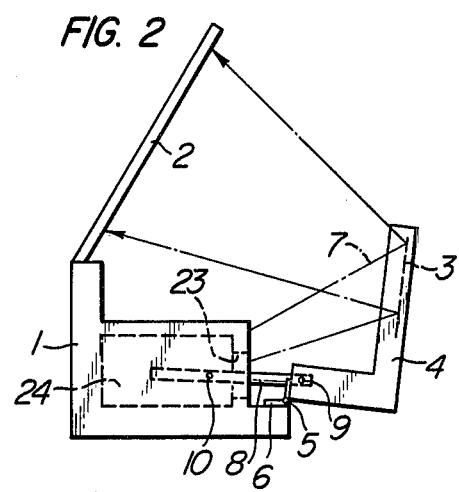
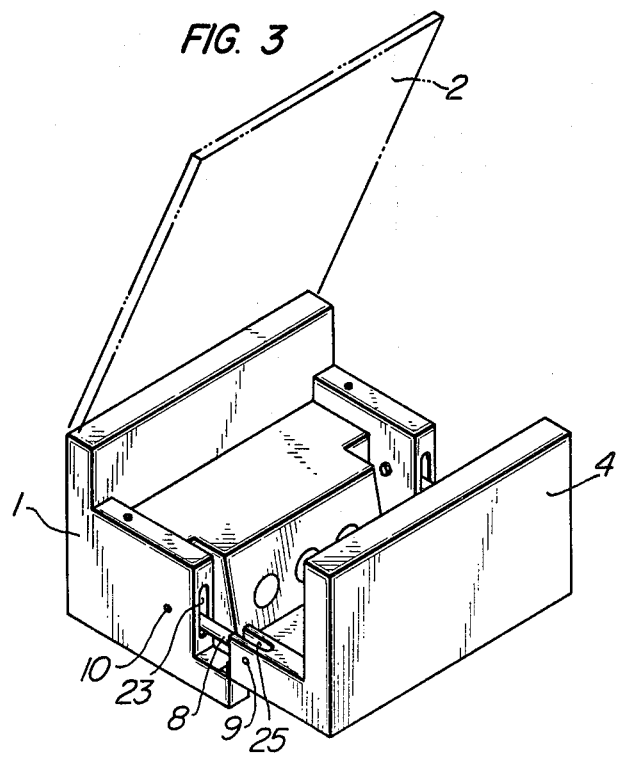

PROJECTION TYPE TELEVISION SET

BACKGROUND OF THE INVENTION

The present invention relates to a projection type television set and, more particularly, to a device for opening and closing the mirror box of a projection type television set.

Various types of projection type television set have been proposed up to now. One of these television sets has a projecting tube encased in a main body, a mirror carried by the main body and adapted for reflecting the light coming from the projecting tube, and a screen on which the reflected light is projected to display an image. In this type of television set, a mirror box to which the mirror is attached is adapted to be opened and closed in relation to the main body so as to minimize the size of the whole apparatus. The mirror box usually has a large weight which well reaches 14 to 15 Kg, and a considerable manual effort is required for opening and closing the mirror box. It is therefore desirable to arrange such that the mirror box can be opened and closed by a relatively small manual effort. Further, it is essential to correctly set the opening angle of the mirror box, so that the light coming from the projecting tube may be correctly reflected and projected on the screen.

SUMMARY OF THE INVENTION

It is therefore an object of the invention to provide a device for opening and closing the mirror box, which permits the opening and closing operation with a small manual force and a fine adjustment of the opening angle of the mirror box.

To this end, according to the invention, there is provided a projection type television set having a main body, a projecting tube accommodated by the main body, a screen attached to the main body and a mirror box mounted on the main body for an opening and closing pivotal movement thereon, thereby, when the mirror box is in the opened state, the light coming from the projecting tube is reflected by the mirror of the mirror box and projected on the screen to display an image, characterized by comprising a control rod interconnecting the mirror box and the main body so as to allow a free opening and closing pivotal movement of the mirror box, the control rod having a tubular body, a spring seat movably received by the tubular body, a pair of coiled springs disposed at respective sides of the spring seat in the tubular body and stoppers against which the outer ends of the pair of coiled springs abut, the tubular body further comprising an elongated slot formed in the wall of the tubular body and extending in the axial direction of the latter, a shaft member engaging the spring seat and extending outwardly of the tubular body through the elongated slot, and another shaft member attached to the other end of the tubular body perpendicularly to the latter, the another shaft being also secured to the mirror box.

The above and other objects, as well as advantageous features of the invention will become more clear from the following description of the preferred embodiment taken in conjunction with the accompanying drawings.

BRIEF DESCRIPTION OF THE DRAWINGS

FIGS. 1 and 2 are side elevational views of a device for opening and closing the mirror box of a projection type television set constructed in accordance with the invention, FIG. 3 is a perspective view of the device as shown in FIG. 1.

DESCRIPTION OF THE PREFERRED EMBODIMENT

Figure 4:
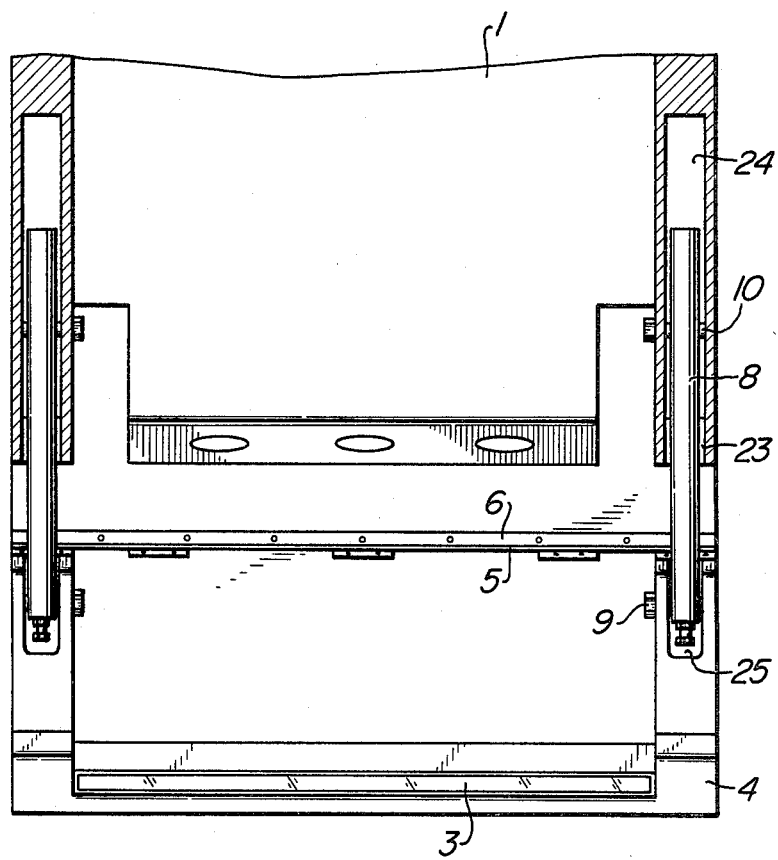
FIG. 4 is a partly-sectioned plan view of the device as shown in FIG. 1, and FIGS. 5 and 6 are front elevational view and a sectional front elevational view of a part of the device as shown in FIG. 1.

Referring first to FIG. 1 showing a projection type television set constructed in accordance with an embodiment of the invention, a screen 2 is attached to a main body 1 containing a projection tube (not shown). A mirror box 4, to which attached is a mirror 3, is pivotally secured to the main body 1 so as to be possible for free opening and closing pivotal movement, about a shaft 5 which constitutes the pivot axis. The shaft 5 belongs to a hinge 6. FIG. 2 shows the same device as that shown in FIG. 1 but in a state in which the mirror box 4 has been opened. The light emitted from the projecting tube in the main body is reflected by the mirror 3, and is projected on the screen 2.

A control rod 8 is provided for controlling the opening and closing of the mirror box 4. Although a single control rod can do well, it is preferred to provide a control rod 8 at each side of the main body 1, as in the illustrated embodiment. Each control rod 8 is pivotally supported at its one end by the mirror box 4 through a shaft 9, and also pivotally supported at its intermediate portion to the main body 1 through a shaft 10. The shaft 9 is adapted to be moved along an elongated slot formed in the wall of the control rod 8. FIG. 3 is a perspective view of an essential part of the projection type television set.

Figure 5:
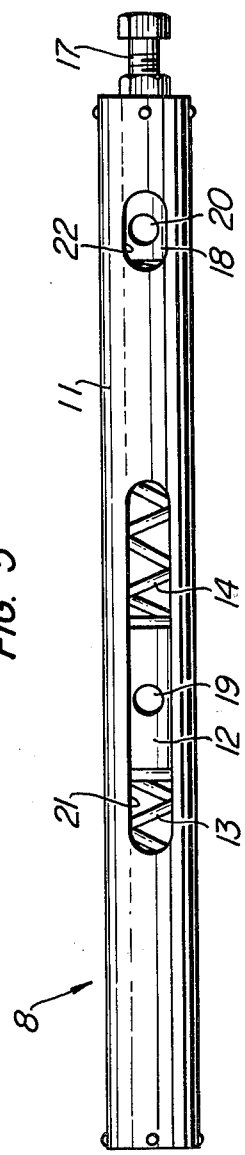
Figure 6:
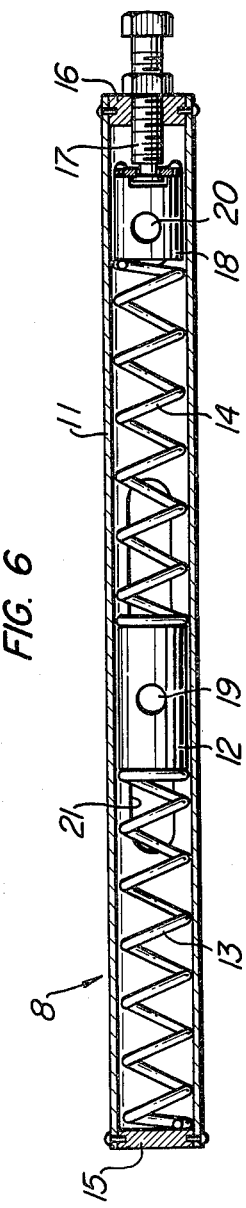

The construction of the control rod 8 will be described in more detail, with specific reference to FIGS. 5 and 6. As will be clearly seen from these Figures, the control rod 8 has a metallic tubular body 11 in which slidably disposed is a cylindrical spring seat 12. Coiled springs 13 and 14 are disposed at respective sides of the spring seat 12. These coiled springs 13, 14 are not connected to the spring seat 12 but merely abut the latter. In other words, the coiled spring 13, spring seat 12 and the spring body 14 are separate bodies. The coiled spring 13 abuts at its outer end a stopper 15 fixed to one end of the tubular body 11. A ring 16, into which a bolt 17 is screwed, is secured to the other end of the tubular body 11. The bolt 17 projects at its one end out of the tubular body 11, while, to the other end of the bolt 17, attached is a sliding body 18. The sliding body 18, to which the coiled spring 14 is pressed at its outer end, functions as a stopper.

The spring seat 12 and the sliding body 18 are provided with apertures 19, 20, respectively, for receiving the shafts 9 and 10 as shown in FIGS. 1 to 3. The arrangement is such that the sliding body 18 is slidingly moved in the cylindrical body to the right and left, as the bolt 17 is rotated.

Elongated slots 21 are formed in the wall of the tubular body 11 so as to diametrically oppose to each other. Both ends of the shaft 10 inserted into the aperture 19 of the spring seat 12 are adapted to move within respective elongated slots 21. Similarly, a pair of diametrically opposing elongated slots 22 are formed in the wall of the tubular body 11 in a portion of the latter corresponding to the sliding body 18. Both ends of the shaft 9 passing through the aperture 20 move along these elongated slots 22.

As will be seen from FIGS. 3 and 4, each control rod 8 is received by a space 24 formed in the side wall of the main body 1 through an elongated opening 23, while the other end of the control rod 8 is adapted to be received by a recess 25 formed in the mirror box 4.

When the mirror box 4 is in the state as shown in FIG. 1, the spring seat 12 has been moved to the right so that the spring 14 is in the compressed condition. This means that the mirror box 4 is normally biased in the clockwise direction by the spring 14 so that the mirror box 4 can be swung to the opened position by a small manual effort.

The movement of the mirror box 4 toward the opened position causes a leftward movement of the spring seat 12, which in turn causes a compression of the spring 13. Since the compressed spring 13 tends to bias the mirror box 4 counter-clockwise, an abrupt declination of the mirror box to the opened position, due to the weight of the mirror box 4 itself, can fairly be avoided and the mirror box is stopped gently and smoothly at the opened position.

Similarly, the swinging movement of the mirror box 4 from the opened position toward the closed position can be started with a small manual force, because the compressed spring 13 in this case assists the manual effort for swinging the mirror box 4 back from the opened position. At the same time, the coiled spring 14 comes to be compressed when the mirror box has been moved nearly to the closed position so as to exert a force which prevents an abrupt declination of the mirror box to the closed position due to its weight.

Further, according to the invention, the sliding body 18 can be moved left and right as the bolt 17 is rotated. This conveniently allows the fine adjustment of the opening angle of the mirror box 4. This fine adjustment of the opening angle is essential for obtaining a correct projection of the image on the screen 2.

As has been described, in the device of the invention for opening and closing the mirror box of the projecting type television set, the heavy mirror box can be moved to and from the opened position with a sufficiently small manual effort. In addition, the opening angle of the mirror box can be finely adjusted by means of the bolt engaging each control rod so as to ensure an optimum condition of projection.

What is claimed is:

1. A projection type television set having a main body, a projecting tube accommodated by said main body, a screen attached to said main body and a mirror box including a mirror, said mirror box being pivotally mounted on said main body for a rotation around an axis between a closed position and an opened position, said mirror being adapted, when said mirror box is in the opened position, to reflect the light coming from said projecting tube and project the light onto said screen, so as to display an image on said screen, characterized by comprising at least one control rod for controlling said rotation of said mirror box between said closed position and said opened position, said control rod including a tubular body, a spring seat movably received by said tubular body, a pair of coiled spring disposed in said tubular body and at respective sides of said spring seat, stoppers attached to respective ends of said tubular body and adapted to be abutted by the outer ends of respective springs, a pair of diametrically opposing elongated slots formed in the wall of said tubular body, at a portion of the latter corresponding to said spring seat, a shaft fixed to said spring seat and projected outwardly of said tubular body through said elongated slots and secured to said main body and another shaft disposed at one end of said tubular body and extending perpendicularly to said tubular body, said another shaft being secured to said mirror box.

2. A projection type television set as claimed in claim 1, characterized by further comprising a ring attached to the end of said control rod closer to said mirror box, a bolt screwed into said ring such that said bolt partly project out of said tubular body and partly received by said tubular body, a sliding body constituted by one of said stoppers and engaged by the inner end of said bolt, and another pair of diametrically opposing elongated slots formed in the wall of said tubular body at the portion of the latter corresponding to the position of said sliding body, said another shaft disposed at one end of said tubular body extending through said another pair of elongated slots and through said sliding body.

* * * * *